(12) United States Patent
Kurosaki

(10) Patent No.: US 10,545,397 B2
(45) Date of Patent: Jan. 28, 2020

(54) LIGHT SOURCE UNIT AND PROJECTOR

(71) Applicant: CASIO COMPUTER CO., LTD., Tokyo (JP)

(72) Inventor: Hideyuki Kurosaki, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/277,064

(22) Filed: Sep. 27, 2016

(65) Prior Publication Data

US 2017/0184951 A1 Jun. 29, 2017

(30) Foreign Application Priority Data

Dec. 24, 2015 (JP) ................................ 2015-250833

(51) Int. Cl.
| | | |
|---|---|---|
| *G03B 21/20* | (2006.01) | |
| *G02B 5/02* | (2006.01) | |
| *G02B 27/09* | (2006.01) | |

(52) U.S. Cl.
CPC ......... *G03B 21/208* (2013.01); *G02B 5/0215* (2013.01); *G02B 5/0221* (2013.01);
(Continued)

(58) Field of Classification Search
CPC .. G03B 21/208; G03B 21/00–64; G02B 5/02; G02B 5/0205; G02B 5/021;
(Continued)

(56) References Cited

U.S. PATENT DOCUMENTS

| | | | | |
|---|---|---|---|---|
| 2005/0128921 A1* | 6/2005 | Inoko | ................ | G02B 27/0905 369/112.09 |
| 2005/0169008 A1* | 8/2005 | Okazaki | ................ | G03B 15/02 362/558 |

(Continued)

FOREIGN PATENT DOCUMENTS

| | | |
|---|---|---|
| JP | 2012-113223 A | 6/2012 |
| JP | 2014-038314 A | 2/2014 |

(Continued)

OTHER PUBLICATIONS

Notification of Reasons for Refusal dated Mar. 8, 2018 received in Japanese Patent Application No. JP 2015-250833 together with an English language translation.

(Continued)

*Primary Examiner* — Cara E Rakowski
*Assistant Examiner* — Christopher A Lamb, II
(74) *Attorney, Agent, or Firm* — Scully Scott Murphy & Presser

(57) ABSTRACT

According to an embodiment of the invention, there is provided a light source unit including a solid light emitting device which emits light source light, a diffuse plate which diffuses the light source light, and a light guiding device which diffuses light which exits from the diffuse plate, wherein the diffuse plate has a plurality of arc-shaped diffuse cells arranged along either of a first direction of an exit side surface thereof which lies opposite to an entrance side where the light source light enters and a second direction that intersects the first direction at substantially right angles, and wherein a diffuse angle in the first direction differs from a diffuse angle in the second direction.

12 Claims, 7 Drawing Sheets

(52) U.S. Cl.
CPC ....... *G02B 5/0278* (2013.01); *G02B 27/0905* (2013.01); *G02B 27/0961* (2013.01); *G02B 27/0994* (2013.01); *G03B 21/2033* (2013.01)

(58) Field of Classification Search
CPC .. G02B 5/0221; G02B 5/0231; G02B 5/0236; G02B 5/0252; G02B 3/0043; G02B 3/0037; G02B 3/006; G02B 5/0215; G02B 5/0278; G02B 27/01–0198; H04N 9/31–9/3197
See application file for complete search history.

(56) References Cited

U.S. PATENT DOCUMENTS

| | | | | |
|---|---|---|---|---|
| 2012/0133900 | A1* | 5/2012 | Miura | H04N 9/315 353/31 |
| 2012/0147334 | A1* | 6/2012 | Mizushima | G02B 13/007 353/31 |
| 2013/0070208 | A1* | 3/2013 | Nakanishi | G03B 21/16 353/31 |
| 2014/0168971 | A1* | 6/2014 | Kurosaki | G03B 21/208 362/235 |
| 2014/0177022 | A1* | 6/2014 | Saisho | G02B 26/101 359/205.1 |
| 2014/0253989 | A1* | 9/2014 | Kurashige | G02B 27/48 359/15 |
| 2015/0138516 | A1* | 5/2015 | Chiu | G03B 21/204 353/85 |
| 2015/0293271 | A1* | 10/2015 | Miyasaka | H04N 9/3152 353/38 |
| 2016/0320615 | A1* | 11/2016 | Nakamura | G02B 3/0043 |
| 2016/0334637 | A1* | 11/2016 | Saisho | H04N 9/3161 |

FOREIGN PATENT DOCUMENTS

| | | |
|---|---|---|
| JP | 2014-139656 A | 7/2014 |
| JP | 2014-191206 A | 10/2014 |
| JP | 2015-184303 A | 10/2015 |
| WO | 2014/104106 A1 | 7/2014 |

OTHER PUBLICATIONS

Notification of Opposition dated Apr. 12, 2019 received in Japanese Patent Application No. JP 2015-250833 together with an English language translation.

* cited by examiner

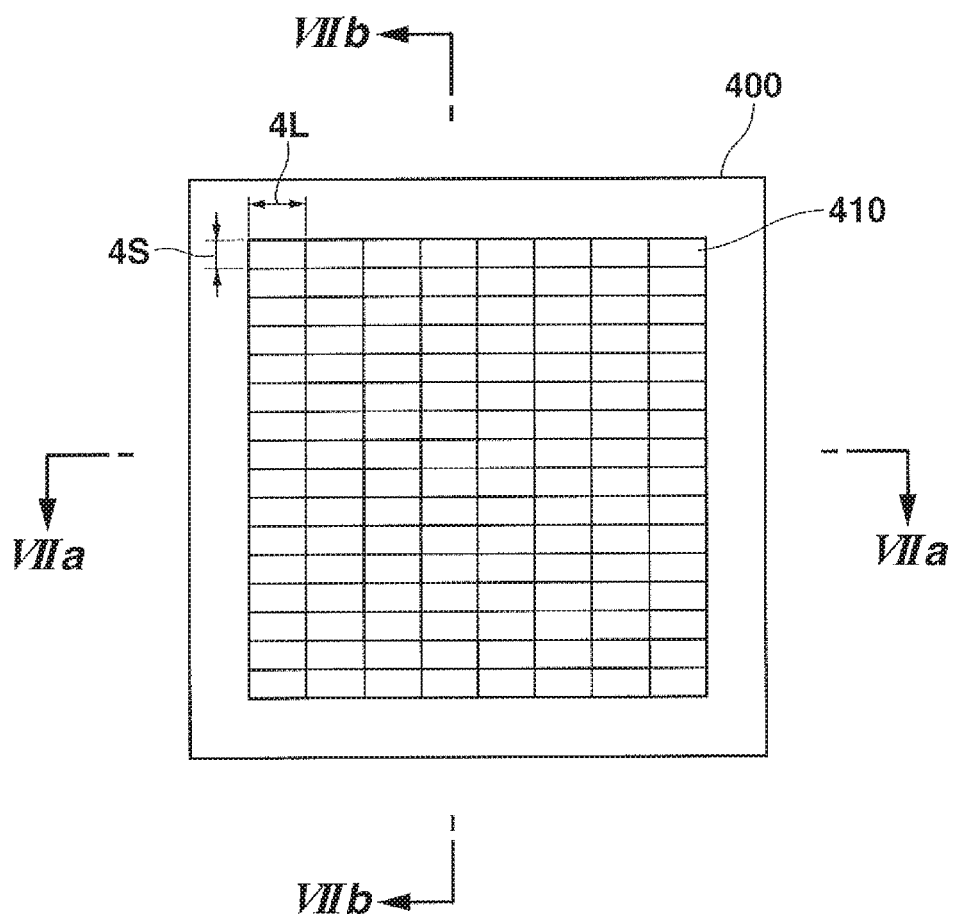

LIGHT SOURCE UNIT AND PROJECTOR

CROSS-REFERENCE TO RELATED APPLICATION

This application is based upon and claims the benefit of priority under 35 USC 119 from Japanese Patent Application No. 2015-250833 filed on Dec. 24, 2015, the entire disclosure of which, including the specification, claims, drawings and abstract, is incorporated herein by reference.

BACKGROUND OF THE INVENTION

Field of the Invention

The present invention relates to a light source unit and a projector including this light source unit.

Description of the Related Art

In these days, data projectors are used on many occasions as an image projection system which projects a screen of a personal computer and a video image, as well as images based on image data which is stored on a memory card on to a screen. In recent years, as these projectors, there have been proposed projectors which employ laser diodes which consume less electric power and which have a long life and high luminance.

A light source optical unit and a projector which are disclosed in Japanese Unexamined Patent Publication No. 2015-184303 (JP-A-2015-184303) include a light source which emits light in a range of green wavelengths, a light source which emits light in a range of red wavelengths and a light source which emits light in a range of blue wavelengths. Light emitted from the individual light sources is incident on a microlens array having a plurality of lens cells which are arc-shaped convex lenses. Then, the light is collected by a collective lens to thereby be shone on to a display device which is made up of DMDs (Digital Micromirror Devices). The lens cells are formed as pairs of an entrance lens cell and an exit lens cell. The light source light that is emitted from the light sources to pass through and exit from the lens cells is shone on to the whole of the display device where the light is superposed on one another.

The light source light of the light source unit is spread and narrowed uniformly by the collective lenses and the like within the projector so that the light source light is adjusted to a desired shining width. Owing to this, in the event that the projection range of an image on a screen is rectangular, the overall shape of the display device becomes rectangular, and it is desirable that each lens cell of the microlens array also takes a rectangular shape that substantially coincides with the aspect ratio of the display device.

On the other hand, in the event that the lens cells each have long sides and short sides like a rectangle, in order to allow incident diffuse light to exit properly from the exit lens cells of the microlens array, it is necessary to limit the magnitude of the entrance angle of the incident diffuse light to a certain magnitude or smaller so as to match the width of the lens cells in the direction of the short side. Owing to this, it is necessary to reduce the diffuse angle of the diffuse plate, thereby making it difficult to make the light uniform.

SUMMARY OF THE INVENTION

The invention has been made in view of the situations described above, and an object of the invention is to provide a light source unit which can reduce the unevenness in luminance of light source light and a projector including the light source unit.

According to an aspect of the invention, there is provided a light source unit including a solid light emitting device which emits light source light, a diffuse plate which diffuses the light source light and a light guiding device which diffuses light which exits from the diffuse plate, wherein the diffuse plate has a plurality of arc-shaped diffuse cells along either of a first direction of an exit side surface thereof which lies opposite to an entrance side where the light source light enters and a second direction that intersects the first direction at substantially right angles, and wherein a diffuse angle in the first direction differs from a diffuse angle in the second direction.

BRIEF DESCRIPTION OF THE SEVERAL VIEWS OF THE DRAWINGS

FIG. 5 is a schematic front view of a microlens array according to the embodiment of the invention.

DETAILED DESCRIPTION OF THE PREFERRED EMBODIMENT

Figure 1:
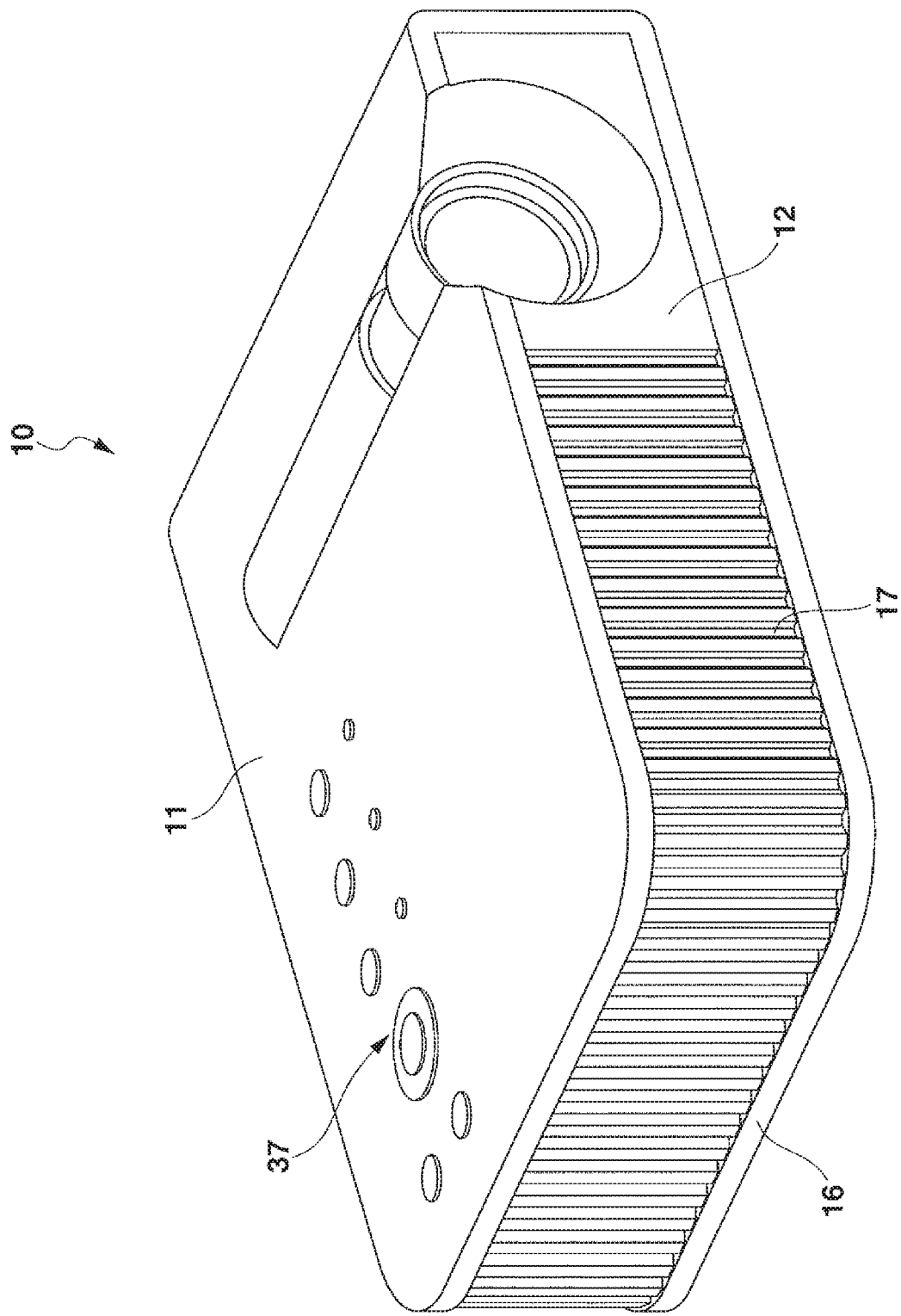
FIG. 1 is an external perspective view of a projector according to an embodiment of the invention.

Hereinafter, an embodiment of the invention will be described based on the accompanying drawings. FIG. 1 is an external perspective view of a projector 10. In this embodiment, when referred to in relation to the direction of the projector 10, left and right denote, respectively, left and right in relation to the projecting direction of the projector 10, and front and rear denote, respectively, front and rear in relation to the direction of a screen as viewed from the projector 10 and a traveling direction of a pencil of light.

As shown in FIG. 1, the projector 10 has a substantially rectangular parallelepiped shape. The projector 10 has a projecting portion at an end portion of a front panel 12 that is a front side panel of a housing of the projector 10. A plurality of inside air outlet slit holes 17 are provided in the front panel 12. Additionally, although not shown, the projector 10 includes an IR reception unit which receives a control signal from a remote controller.

A keys/indicators unit 37 is provided on an upper case 11 of the housing. Disposed on this keys/indicators unit 37 are keys and indicators that include a power supply switch key, a power indicator, a projection switch key, and an overheat indicator. The power indicator informs whether a power supply is on or off. The projection switch key switches on or off the projection by the projector 10. The overheat indicator informs of an overheat condition occurring in a light source unit, a display device, or a control circuit when they really overheat. In addition, the upper case 11 covers an upper surface and part of a left side surface of the housing of the projector 10, and the upper case 11 is allowed to be removed from a lower case 16 when a failure occurs in the projector 10.

In the projector 10, provided on a back panel of the housing are an input/output connector unit where USB terminals, a video signal input D-SUB terminal into which analog RGB video signals are inputted, an S terminal, an RCA terminal and a voice output terminal are provided and various types of terminals including a power supply adaptor. Additionally, a plurality of outside air inlet slit holes are formed in the back panel.

Figure 2:
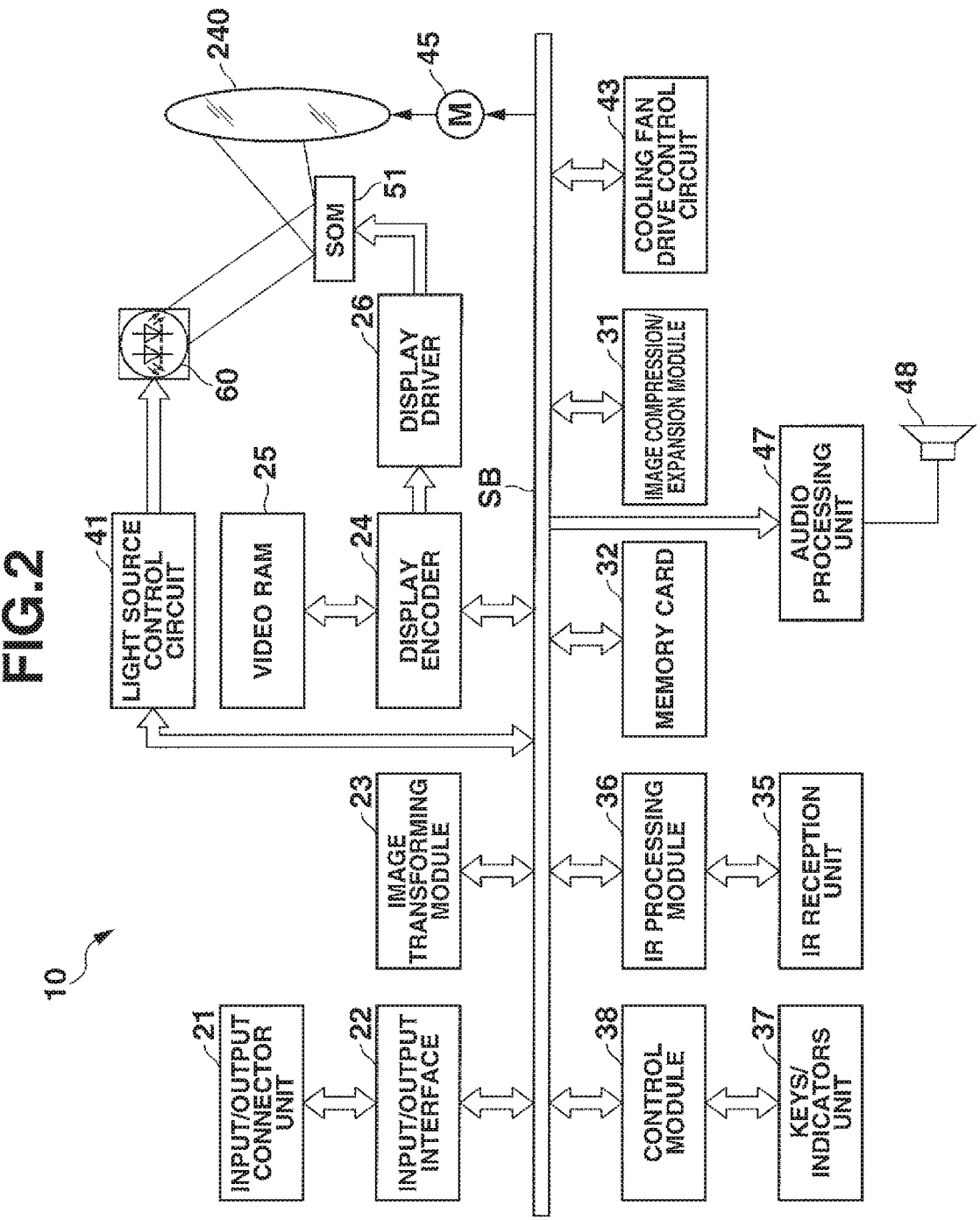
FIG. 2 is a diagram showing functional blocks of the projector according to the first embodiment of the invention.

Next, a control unit of the projector 10 will be described by the use of a functional block diagram shown in FIG. 2. The control unit includes a control module 38, an input/output interface 22, a image transforming module 23, a display encoder 24 and a display driver 26.

This control module 38 governs the control of respective operations of circuitries within the projector 10 and is made up of a CPU, a ROM which stores in a fixed fashion operation programs of various types of settings and a RAM which is used as a working memory.

Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the control unit. Thereafter, the image signals so transformed are outputted to the display encoder 24.

The display encoder 24 deploys the image signals inputted thereinto on a video RAM 25 for storage therein and generates a video signal from the contents stored in the video RAM 25, outputting the video signal so generated to the display driver 26.

The display driver 26 functions as a display device control device and drives a display device 51, which is a spatial optical modulator (SOM), at an appropriate frame rate according to the image signal outputted from the display encoder 24.

In this projector 10, a pencil of light that is emitted from a light source unit 60 is shone onto the display device 51 via an optical system, whereby an optical image is formed by using reflected light that is reflected by the display device 51. The image so formed is then projected on to a screen, not shown, via a projection-side optical system 230. In addition, a movable lens group 240 of the projection-side optical system 230 is driven by a lens motor 45 for zooming or focusing.

An image compression/expansion module 31 performs a recording operation in which a luminance signal and a color difference signal of an image signal are data compressed through ADCT and Huffman coding processes and the compressed data is sequentially written on a memory card 32 which is configured as a detachable recording medium.

Further, when in a reproducing mode, the image compression/expansion module 31 performs the following operations. Specifically, the image compression/expansion module 31 reads out image data recorded on the memory card 32 and expands individual image data which make up a series of dynamic images frame by frame. Then, the image compression/expansion module 31 outputs the image data to the display encoder 24 via the image transforming module 23 so as to enable the display of dynamic images based on the image data stored on the memory card 32.

Operation signals which are generated at the keys/indicators unit 37 which includes the main keys and indicators which are provided on the upper case 11 of the housing are sent out directly to the control module 38. Key operated signals from the remote controller are received by the IR reception unit 35, and a code signal demodulated at an IR processing module 36 is outputted to the control module 38.

In addition, an audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a speaker 48 so as to output loudly sound or voice based on the audio data.

The control module 38 controls a light source control circuit 41 which is configured as a light source control unit. This light source control circuit 41 controls individually the emission of light in ranges of red, green and blue wavelengths from the light source unit 60 so that specified ranges of wavelengths of light that are required in producing an image are emitted from the light source unit 60.

Further, the control module 38 causes a cooling fan drive control circuit 43 to detect temperatures through a plurality of temperature sensors which are provided in the light source unit 60 so as to control the rotating speeds of cooling fans based on the results of the temperature detections. Additionally, the control module 38 also causes the cooling fan drive control circuit 43 to keep the cooling fans rotating even after the power supply to a projector main body of the projector 10 is switched off by use of a timer. Alternatively, the control module 38 causes the cooling fan drive control circuit 43 to cut off the power supply to the projector main body of the projector 10 depending upon the results of the temperature detections by the temperature sensors.

Figure 3:
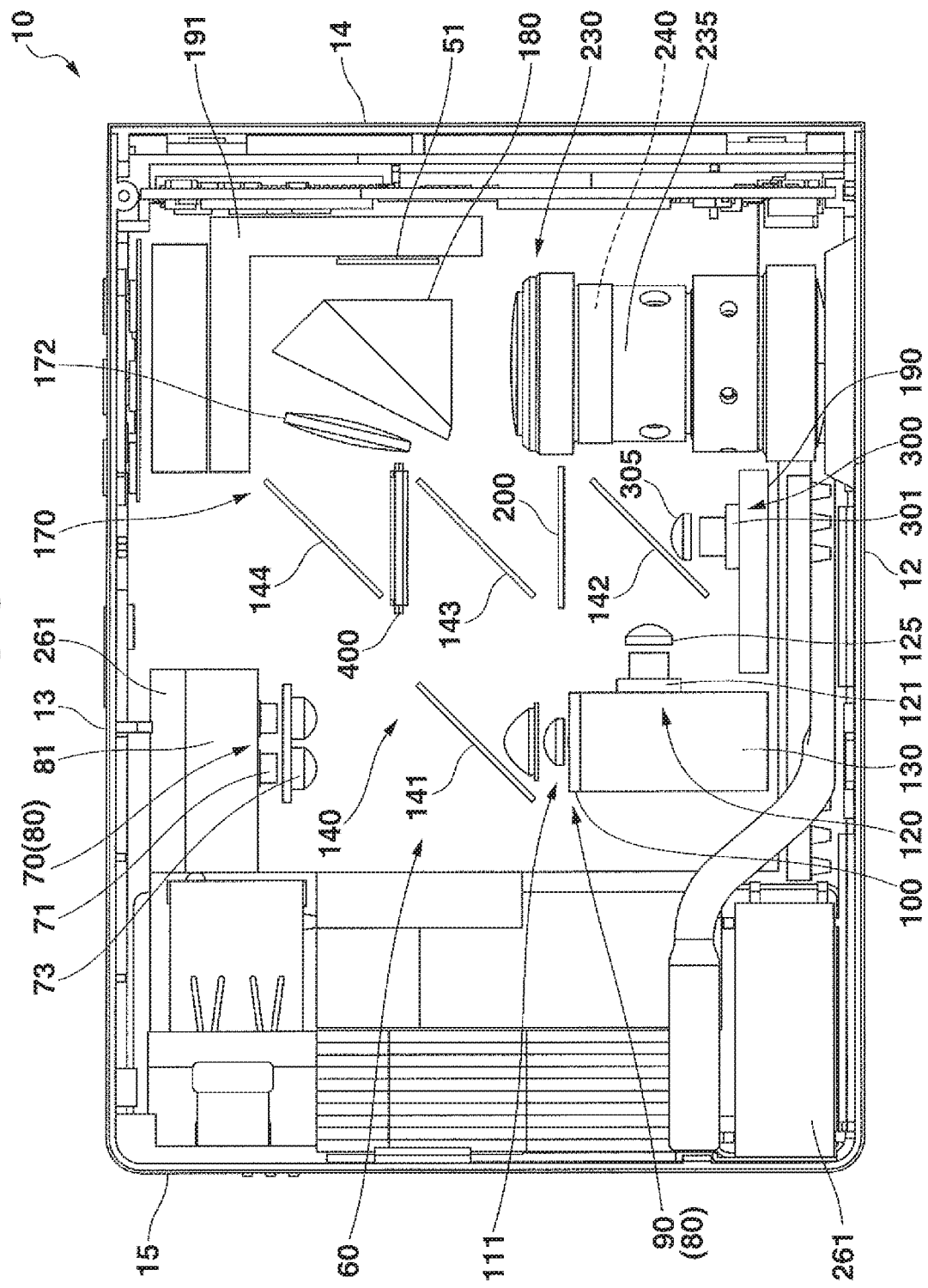
FIG. 3 is a schematic plan view showing an internal construction of the projector according to the embodiment of the invention.

Next, an internal construction of the projector 10 will be described. FIG. 3 is a schematic plan view showing the internal construction of the projector 10. The projector 10 includes the light source unit 60 which is provided at a central portion and a lens barrel 235 which is provided on the left (the right in FIG. 3) of the light source unit 60. The lens barrel 235 is installed as part of the projection-side optical system 230. The projector 10 includes a main control circuit board, not shown, below the light source unit 60.

The light source unit 60 includes a green light source device 80, a red light source device 120 and a blue light source device 300. The light source unit 60 includes a light source-side optical system 140 and a light guiding optical system 170 which guide light source light emitted individually from the light source devices 80, 120, 300. The green, red and blue light sources 80, 120, 300 will be described one by one.

The green light source device 80 includes an excitation light shining device 70 and a luminous light emitting device 90. The excitation light shining device 70 includes a plurality of blue laser diodes 71 which emit excitation light. A plurality of collimator lenses 73 are disposed individually on optical axes of the blue laser diodes 71 to covert light emitted from the corresponding blue laser diodes 71 into parallel light so as to enhance the directivity thereof.

A heat sink 81 is provided between the blue laser diodes 71 and the back panel 13. Further, a cooling fan 261 is disposed on a side of the heat sink 81 which faces the back panel 13 to send outside air as a cooling medium towards the heat sink 81. Thus, the excitation light shining device 70 is cooled by the cooling fan 261 and the heat sink 81.

The luminous light emitting device 90 of the green light source device 80 includes a luminescent plate 100 and a collective lens group 111. The luminescent plate 100 is disposed so as to be parallel to the front panel 12 or to be at right angles to an axis of light emitted from the excitation light shining device 70. The collective lens group 111 collects pencils of light emitted from the luminescent plate 100 in the direction of the back panel 13. A heat sink 130 is disposed between the luminescent plate 100 and the front panel 12 to thereby cool the luminescent plate 100.

The luminescent plate 100 is formed of, for example, a sheet-like metallic base material. A surface of the luminescent plate 100 which faces the excitation light shining device 70 is made into a reflecting surface which reflects light. A luminous light emitting area is laid out on this reflecting surface. A luminescent material is provided on the luminous light emitting area, and this luminescent material emits luminous light in the range of green wavelengths when receiving excitation light emitted from the excitation light shining device 70. The reflecting surface is formed by mirror finishing the surface of the luminescent plate 100 through silver deposition or the like.

When receiving light emitted from the excitation light shining device, the luminescent material emits luminous light in every direction. Part of the luminous light so emitted is directed directly towards the collective lens group 111, while the other part of the luminous light is reflected on the reflecting surface of the luminescent plate 100 so as to be then emitted to the collective lens group 111.

In addition, excitation light which is shone on to the metallic base material without exciting the luminescent material is reflected by the reflecting surface to be incident on the luminescent material to thereby excite the luminescent material. Owing to this, by making the surface of the luminescent plate 100 into the reflecting surface, the utilization efficiency of excitation light emitted from the excitation light shining device 70 can be enhanced, thereby making it possible to emit light in the range of green wavelength more brightly.

The red light source device 120 includes a red laser diode (a solid light emitting device) 121 which emits light in the range of red wavelengths and a collimator lens 125 which enhance the directivity of light emitted from the red laser diode 121. Light in the range of red wavelengths which is emitted from the red laser diode 121 is converted into parallel light via the collimator lens 125.

The blue light source device 300 includes a blue laser diode (a solid light emitting device) 301 which emits light in the range of blue wavelengths and a collimator lens 305 which enhances the directivity of light emitted from the blue laser diode 301. Light in the range of blue wavelengths which is emitted from the blue laser diode 301 is converted into parallel light via the collimator lens 305. The blue laser diode 301 is disposed so that light emitted therefrom forms an elliptic shape which is elongated vertically. A heat sink 130 configured to cool the red light source device 120 and the luminous light emitting device 90 and a heat sink 190 configured to cool the blue light source device 300 are provided between the light source unit 60 and the front panel 12.

A cooling fan 261 is disposed near the front panel 12 and a left side panel 15, that is, on the periphery of the heat sinks 130, 190, and this cooling fan 261 discharges the cooling medium warmed up by the heat sinks 130, 190 to the outside of the projector 10. This cooling fan 261 cools the red laser diode 121 and the blue laser diode 301.

The light source unit 60 includes, as the light source-side optical system 140, a first dichroic mirror 141, a second dichroic mirror 142, a diffuse plate 200, a third dichroic mirror 143 and a microlens array 400.

The first dichroic mirror 141 is disposed between the excitation light shining device 70 and the luminous light emitting device 90. The first dichroic mirror 141 transmits light in the blue wavelength range and reflects light in the green wavelength range. Excitation light which is emitted from the excitation light shining device 70 to excite the luminescent material may be light in any wavelength range as long as the wavelength thereof is shorter than the wavelength of luminous light emitted from the luminescent material. Namely, in this embodiment, since the luminous light is light in the green wavelength range, light in the blue wavelength range is used as excitation light. However, the excitation light shining device 70 may emit light in a range of violet wavelengths or light in a range of ultraviolet wavelengths whose wavelength is shorter than that of the light in the green wavelength range.

Light in the blue wavelength range which is emitted from the excitation light emitting device 70 is transmitted through the first dichroic mirror 141 and is then shone on to the luminescent material. Light in the green wavelength range which is emitted from the luminescent plate 100 is reflected by the first dichroic mirror 141 via the collective lens group 111 and is then emitted towards the third dichroic mirror 143.

The second dichroic mirror 141 is disposed in a position where an optical path of light in the red wavelength range which is emitted from the red light source device 120 intersects an optical path of light in the blue wavelength range which is emitted from the blue light source device 300. The second dichroic mirror 142 reflects light in the red wavelength range and transmits light in the blue wavelength range. Owing to this, light in the red wavelength range which is emitted from the red light source device 120 is reflected by the second dichroic mirror 142 to be emitted towards the diffuse plate 200. In addition, light in the blue wavelength range which is emitted from the blue light source device 300 is transmitted through the second dichroic mirror 142 and is then emitted towards the diffuse plate 200.

The diffuse plate 200 is disposed on optical paths of the light in the red wavelength range which is reflected by the second dichroic mirror 142 and the light in the blue wavelength range which is transmitted through the second dichroic mirror 142. The diffuse plate 200 transmits incident light while diffusing the light. The details of the diffuse plate 200 will be described later.

The third dichroic mirror 143 is disposed on optical paths of the light in the green wavelength range which is reflected by the first dichroic mirror 141 and the light in the red wavelength range and the light in the blue wavelength range which are transmitted through the diffuse plate 200 while being diffused. The third dichroic mirror 143 reflects light in the green wavelength range and transmits light in the red wavelength range and light in the blue wavelength range. As a result of the light in the green wavelength range which is incident on the third dichroic mirror 143 being reflected towards the microlens array 400, the light in the red wavelength range and the light in the blue wavelength range are emitted towards the microlens array 400 with both the axes of the light in the red wavelength range and the light in the blue wavelength range coinciding with the axis of the light in the green wavelength range.

The microlens array 400 diffuses light of each color emitted from the third dichroic mirror 143 so as to distribute the luminance uniformly. The details of the microlens array 400 will be described later.

The projector 10 includes the light guiding optical system 170 which guides light emitted from the light source-side optical system 140 and the projection-side optical system 230. The light guiding optical system 170 has a reflecting mirror 144, a collective lens 172, and a prism 180. The projection-side optical system 230 has the lens barrel 235. The prism 180 doubles as part of the projection-side optical system 230.

The light source light of each color which is emitted from the microlens array 400 is reflected by the reflecting mirror 144 and is then incident on the collective lens 172. The collective lens 172 collects the light which is emitted from the microlens array 400 while being diffused to distribute the luminance uniformly to an effective size of the display device 51. A heat sink 191 configured to cool the display device 51 is provided between the display device 51, a left side panel 14 and the back panel 13.

The light source of each color whose luminance is distributed uniformly by the microlens array 400 is incident on the prism 180 via the collective lens 172. This prism 180 is an RTIR (Reverse Total Internal Reflection) prism and functions not only as a condenser lens which shines the light source light on to the display device 51 but also as a light axis changing device which changes an axis of projected light generated in the display device 51 so as to coincide with an optical axis of the lens barrel 235.

A light tunnel, a glass rod and the like may be used in place of the microlens array 400.

On light that is reflected by the display device 51 is projected on to a screen as projected light by the projection-side optical system 230. This projection-side optical system 230 includes a fixed lens group which is incorporated in the lens barrel 235 and a movable lens group 240 which is incorporated in a movable lens barrel. The lens barrel 235 is a variable-focus lens equipped with a zooming function and can execute zooming and focusing controls are a result of the movable lens group 240 being moved by the lens motor.

By configuring the projector 10 in the way described above, green light source light, red light source light and blue light source light which are emitted from the light source unit 60 at arbitrary timings are sequentially incident on the microlens array 400 and the collective lens 172 and are then incident on the display device 51 via the prism 180. The projector 10 can project a color image on to the screen by displaying light of each color corresponding to data in a time-sharing fashion by the display device 51 which is made up of DMDs of red, green and blue colors.

Figure 4A:
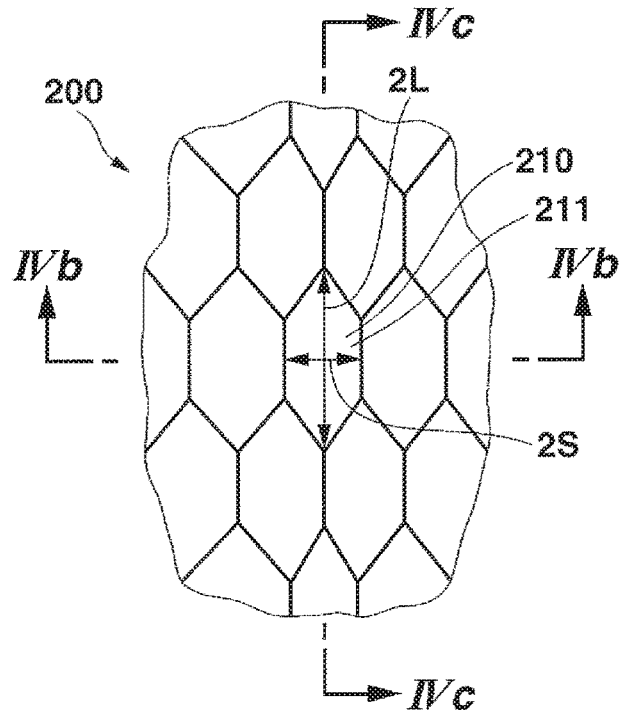
FIG. 4A is an enlarged schematic plan view showing part of a diffuse plate of a light source unit according to the embodiment of the invention in an enlarged fashion.
Figure 4B:
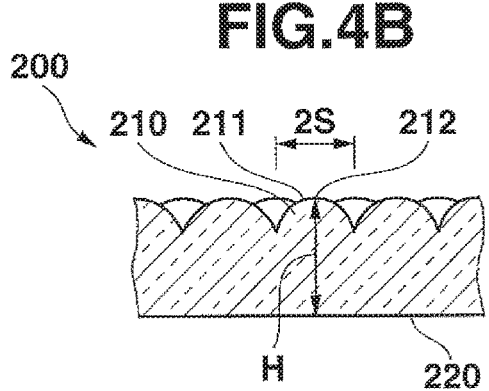
FIG. 4B is a sectional view taken along a line IVb-IVb in FIG. 4A.
Figure 4C:
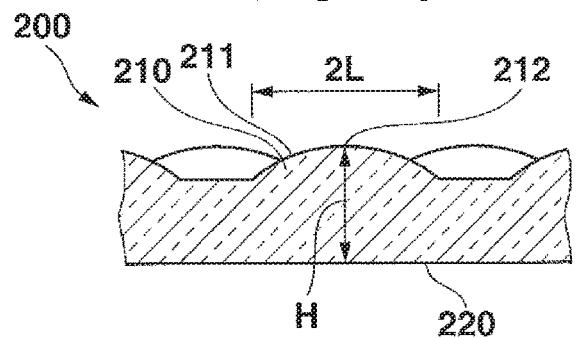
FIG. 4C is a sectional view taken along a line IVc-IVc in FIG. 4A.

Next, the diffuse plate 200 will be described in detail. FIG. 4A is a partially enlarged schematic plan view of an exit side of the diffuse plate 200 of the light source unit 60. FIG. 4B is a sectional view taken along a line IVb-IVb in FIG. 4A. FIG. 4C is a sectional view taken along a line IVc-IVc in FIG. 4B.

The diffuse plate 200 of this embodiment has a plurality of minute diffuse cells 210 on an exit side thereof from which light source light exits and is formed so that diffuse angles of two directions can be adjusted. As shown in FIG. 4A, the diffuse cells 210 have non-regular hexagonal shapes in which one direction represents a major axis 2L and the other direction represents a minor axis 2S which is at right angles to the major axis 2L. The plurality of diffuse cells 210 are made up of diffuse cells of different shapes so that at least all of the plurality of diffuse cells 210 do not take the same shape. The diffuse cells 210 may be formed as a combination of a plurality of groups of diffuse cells of different shapes or all of the diffuse cells 210 may be formed of diffuse cells of different shapes. The shape of the diffuse cells 210 is not limited to the hexagonal shape, and hence, the diffuse cells 210 may be formed into any polygonal shapes.

As shown in FIGS. 4B and 4C, each diffuse cell 210 has a convex regular arc-shaped lens surface 211. In this embodiment, the diffuse cells 210 are formed so that a height H of each lens surface 211 from an incident plane 220 becomes the same over all the diffuse cells 210. Owing to this, the longer the major axis 2L and the minor axis 2S are extended, the greater a radius of curvature becomes. In this embodiment, a radius of curvature of the lens surface 211 of each diffuse cell 210 in the direction of the major axis 2L (a first direction) is greater, and a radius of curvature of the lens surface 211 in the direction of the minor axis 2S (a second direction) is smaller. Thus, light source light which is incident on the diffuse plate 200 is transmitted therethrough while being diffused at different diffuse angles between the direction of the major axis 2L and the direction of the minor axis 2S. In addition, even in the same direction, the length of the major axis 2L and the length of the minor axis 2S differ depending on the diffuse cells 210. Thus, the radius of curvature of the lens surface 211 can be formed differently depending on the diffuse cells 210 even in the same direction, whereby the diffuse angles of the diffuse cells 210 can be varied. For example, a mean value of the diffuse angles in the direction of the minor axis 2S is set at a diffuse angle θa in advance, and a full width at half maximum of a variation of the mean value can be set at ±5°. Likewise, a mean value of the diffuse angles in the direction of the major axis 2L is set in advance at a diffuse angle θb, and a full width at half maximum of a variation of the mean value can be set at ±5°. These diffuse cells 210 can be prepared of a transparent material such as glass or resin through pressing.

An apex 212 of each diffuse cell 210 in this embodiment is positioned at the center of the diffuse cell 210 in the sectional views shown in FIGS. 4B and 4C. However, in order for diffusing directions to vary in the same direction, the lens surfaces 211 of part of the diffuse cells 210 may be shaped so that the apex 212 is deviated in the direction of the major axis 2L or the direction of the minor axis 2S.

FIG. 5 is a front view of the microlens array 400. In this embodiment, the microlens array 400 has a plurality of lens cells 410 which are arranged into a matrix or grid. When looking at each lens cell 410 from thereabove from a direction in which light source light is incident, each lens cell 410 has a horizontally elongated rectangular shape made up of long sides 4L extending in one direction and short sides 4S extending in the other direction and is formed into a convex arc-like shape. The diffuse plate 200 is disposed so that the direction of the major axis 2L (the first direction) and the direction of the minor axis 2S (the second direction) of each diffuse cell 210 coincide respectively with the direction of the short side 4S and the direction of the long side 4L of each lens cell 410 of the microlens array 400. Namely, since the direction of the long side 4L of the lens cell 410 is disposed in a left-to-right direction which is normal to the direction of the axis of the light source light, the direction of the minor axis 2S of the diffuse cell 210 is also disposed in the left-to-right direction which is normal to the direction of the axis of the light source light.

The shape of the lens cell 410 can be a similar shape whose aspect ratio is substantially the same as that of the display device 51 when looking at the lens cell 410 from the front. Owing to this, it is possible to decrease the risk of a leakage of light source light shone as seen from the front which represents the incident direction of light or a reduction in utilization efficiency of light. In addition, by shining diffuse light emitted from the diffuse plate 200 on to a wide range over the microlens array 400 where many lens cells 410 are contained, it is possible to reduce more the unevenness in luminance of the projector 10.

Figure 6A:
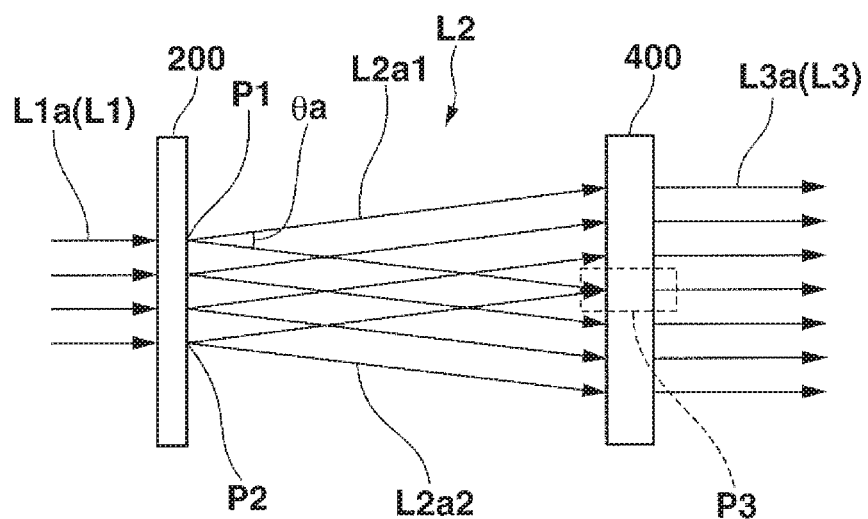
FIG. 6A is a schematic view (a top view) showing optical paths in the diffuse plate and the microlens array according to the embodiment of the invention.
Figure 6B:
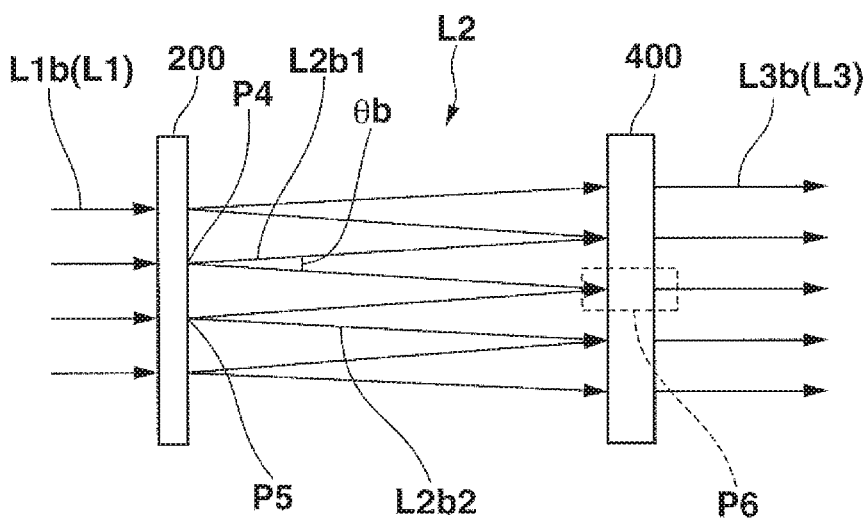
FIG. 6B is a schematic view (a side view) showing the optical paths in the diffuse plate and the microlens array according to the embodiment of the invention.

Next, optical paths of light source light in the diffuse plate 200 and the microlens array 400 will be described. FIG. 6 shows schematic views showing optical paths in the diffuse plate 200 and the microlens array 400. FIG. 6A is a top view and FIG. 6B is a side view. Light rays indicted by arrows in the figures are simplified to illustrate optical paths which light rays incident on several positions on the diffuse plate 200 would take.

Light source light (light in the red wavelength range and light in the blue wavelength range) L1 emitted via the second dichroic mirror 142 is incident on the diffuse plate 200. The light source light L1 which is incident on the diffuse plate 200 is transmitted through the diffuse plate 200 while being diffused and is then emitted from the diffuse plate 200 as diffuse light L2. Thereafter, the diffuse light L2 is incident on the microlens array 400. The diffuse light L2 which is incident on the microlens array 400 is emitted as emerging light L3 whose luminance is distributed uniformly towards the reflecting mirror 144.

The radius of curvature of the lens surface 211 of the diffuse cell 210 in the direction of the minor axis 2S in FIG. 4B is, as described above, smaller than the radius of curvature of the lens surface 211 of the diffuse cell 210 in the direction of the major axis 2L in FIG. 4C. Owing to this, a diffuse angle θa of the diffuse plate 200 in the direction of the long side 4L in the top view shown in FIG. 6A is greater than a diffuse angle θb of the diffuse plate 200 in the direction of the short side 4S in the side view shown in FIG. 6B.

The diffuse light 2L will be described. In the top view shown in FIG. 6A, a diffuse light ray L2a1 which is emitted from an emitting point P1 at one end of the diffuse plate 200 is diffused at the wide diffuse angle θa and is then shone on to the microlens array 400. In addition, a diffuse light ray L2a2 which is emitted from an emitting point P2 at the other end of the diffuse plate 200 which lies far away from the emitting point P1 is also diffused at the wide diffuse angle θa and is then shone on to the microlens array 400. The diffuse light rays L2a1, L2a2 emitted from the emitting points P1, P2, respectively, are incident on the microlens array 400 at an incident area P3.

Figure 7A:
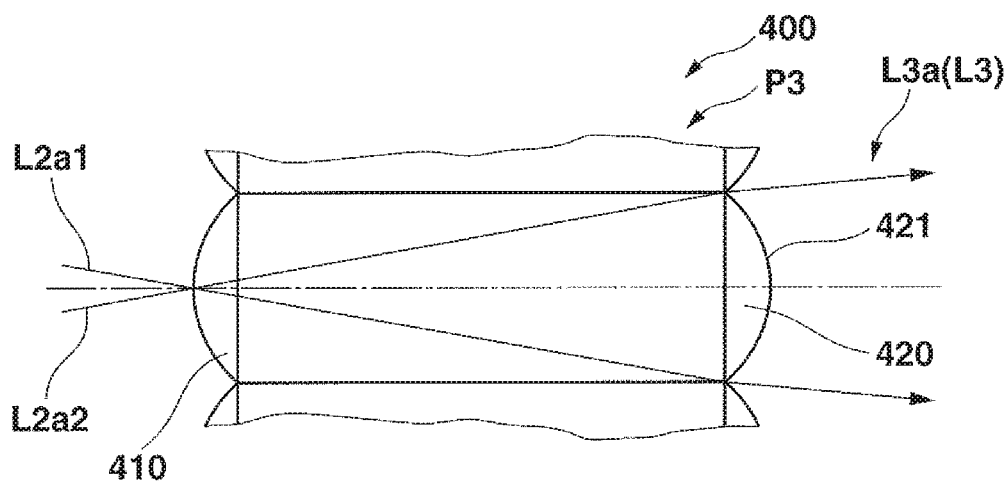
FIG. 7A is an enlarged schematic view (a top view) showing the optical paths in the microlens array according to the embodiment of the invention shown in FIG. 6A.

FIG. 7A is an enlarged schematic view showing part of the optical paths in the microlens array 400 shown in FIG. 6A. This figure is a top view showing a pair of an entrance side lens cell 410 and an exit side lens cell 420 at the incident area P3 and corresponds to an enlarged sectional view taken along a line VIIa-VIIa in FIG. 5. The diffuse light ray L2a1 emitted from the emitting point P1 at the wide diffuse angle and the diffuse light ray L2a2 emitted from the emitting point P2 at the wide diffuse angle pass through the interior of the microlens array 400 to reach an emerging plane 421 without deviating from the exit side lens cell 420 and is allowed to emerge therefrom towards the reflecting mirror 144 as emerging light rays L3a from the microlens array 400.

In the side view shown in FIG. 6B, a diffuse light ray L2b1 which is emitted from an emitting point P4 at one end of the diffuse plate 200 is diffused at the narrow angle θb and is shone on to the microlens array 400. In addition, a diffuse light ray L2b2 which is emitted from an emitting point P5 at the other end of the diffuse plate 200 which lies far away from the emitting point P4 is also diffused at the narrow angle θb and is then shone on to the microlens array 400. The diffuse light rays L2b1, L2b2 which are emitted from the emitting points P4, P5, respectively, are incident on the microlens array 400 at an incident area P6.

Figure 7B:
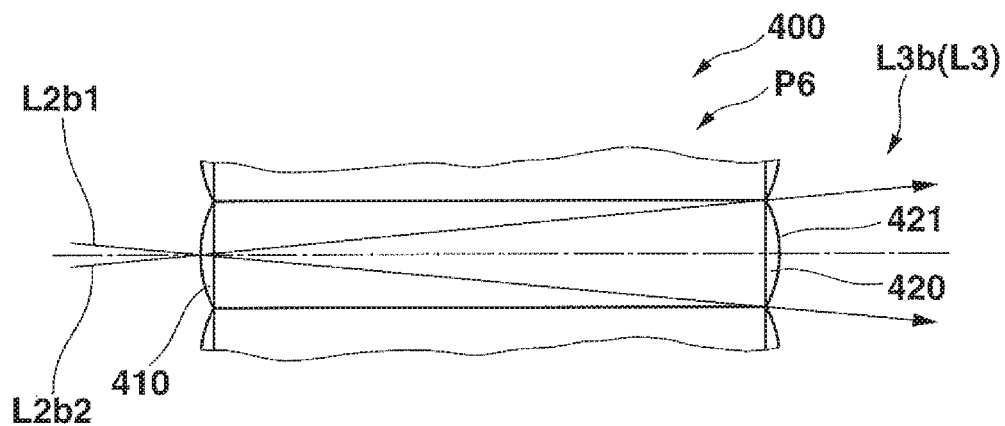
FIG. 7B is an enlarged schematic view (a side view) showing the optical paths in the microlens array according to the embodiment of the invention shown in FIG. 6B.

FIG. 7B is an enlarged schematic view showing part of the optical paths in the microlens array 400 shown in FIG. 6B. This figure is a side view showing a pair of an entrance side lens cell 410 and an exit side lens cell 420 at the incident area P6 and corresponds to an enlarged sectional view taken along a line VIIb-VIIb in FIG. 5. The diffuse light ray L2b1 emitted from an emitting point P4 at the narrow diffuse angle and the diffuse light ray L2b2 emitted from an emitting point P5 at the narrow diffuse angle pass through the interior of the microlens array 400 to reach an emerging plane 421 without deviating from the exit side lens cell 420 and is allowed to emerge therefrom towards the reflecting mirror 144 as emerging light rays L3b from the microlens array 400.

Not only the diffuse light rays L2a1, L2a2 emitted from the two emitting points P1, P2 but also the diffuse light rays L2 emitted from the other emitting points so as to lie inside the diffuse light rays L2a1, L2a2 are incident on the lens cell 410 in the incident area P3 shown in FIG. 7A. The diffuse light rays L2 which are emitted from the other emitting points so as to lie inside the diffuse light rays L2a1, L2a2 are incident on the lens cell 410 at a smaller entrance angle than that of the diffuse light rays L2a1, L2a2, and therefore, the diffusion light rays L2 reach the emerging plane 421 without deviating from the exit side lens cell 420 which makes the pair with the lens cell 410.

Although one of the plurality of lens cells 410 in the incident areas P3, P6 is used to describe the optical paths of the diffusion light rays in FIGS. 7A, 7B, the same thing occurs at the other lens cells at a plurality of locations in the incent areas P3, P6. Specifically speaking, diffuse light rays reach emerging planes without deviating from exit side lens cells and are then emitted towards the reflecting mirror 144 as emerging light rays L3 from the microlens array 400.

In this embodiment, the shining range of the light source light L1a which is incident on the diffuse plate 200 in the front view shown in FIG. 6A is made narrower than the shining range of the light source light L1b which is incident on the diffuse plate 200 in the side view shown in FIG. 6B. However, the shining ranges may be made substantially equal to each other.

According to this embodiment, the entrance angle of light which is incident in the direction of the long side 4L of the microlens array 400 is made greater than the entrance angle of light which is incident in the direction of the short side 4S by using the diffuse plate 200 in which the diffuse angle differs in the plurality of directions. Consequently, not only can the diffusing effect of light source light be enhanced according to the aspect ratio of the display device 51 but also the luminance of the light source light can be distributed uniformly, thereby making it possible to provide the light source unit 60 which can decrease the unevenness in luminance and the projector 10 which includes the light source unit 60.

Thus, while the embodiment of the invention has been described heretofore, the invention is not limited to the embodiment and hence can be carried out while altering or modifying the embodiment as required. For example, in the front view shown in FIG. 4A, the diffuse cells 210 are described as having the hexagonal shapes. However, other shapes including a rectangular shape can be adopted as long as the shapes allow the adjacent diffuse cells 210 to lie in contact with one another.

In the diffuse plate 200, a cylindrical lens array in which a plurality of convex arc-shaped cylindrical lenses are disposed on an exit side may be provided in place of the diffuse cells 210. As this occurs, for example, the cylindrical lens array can be provided behind a diffuse plate of another diffuse plate (a second diffuse plate) on which minute irregularities are formed through sandblasting, whereby light source light diffused in an isotropic direction can be emitted while suppressing a diffuse angle in one direction.

The green light source device 80 may be configured so that light in the green wavelength range is emitted by a green laser diode (a solid light emitting device). As this occurs, light in the green wavelength range becomes coherent light, and therefore, like the light in the red wavelength range and the light in the blue wavelength range which are described in the embodiment, it is desirable that the light in the green wavelength range is diffused by the diffuse plate 200 and is thereafter caused to be incident on the microlens array 400. Namely, as an example of arrangement of the constituent parts in the light source-side optical system 140 shown in FIG. 3, the positions of the diffuse plate 200 and the third dichroic mirror 143 are exchanged with each other so that the light in the green wavelength range is reflected by the third dichroic mirror 143 and is then incident on the diffuse plate 200. As this occurs, the light in the red wavelength range which is reflected by the second dichroic mirror 142 and the light in the blue wavelength range that is transmitted through the second dichroic mirror 142 are transmitted through the third dichroic mirror 143 and can then be incident on the diffuse plate 200. In this way, red, green and blue coherent light emitted by the red, green and blue laser diodes is sequentially incident on the diffuse plate 200 and the microlens array 400.

In this embodiment, the radius of curvature of each of the lens surfaces 211 of the diffuse cells 210 in each direction is described as becoming different according to the shape as seen from the front as shown in FIG. 4A. However, the radius of curvature in each direction may be made to differ irrespective of the lengths of the major axis 2L and the minor axis 2S.

For example, part of the plurality of diffuse cells 210 may contain diffuse cells 210 whose heights H defined between the lens surface 211 and the incident plane 220 differ from one another. Namely, by configuring so that the lens surface 211 of the diffuse cell 210 whose height H is high has a small radius of curvature, while the lens surface 211 of the diffuse cell 210 whose height H is low has a great radius of curvature, it is possible to vary the respective diffuse angles of the diffuse cells 210.

In this embodiment, the diffuse cells 210 are described as being elongated longer in one direction as seen from the front. However, anisotropy may be imparted to the diffuse angle of light emitted from the diffuse cells by other methods. For example, in a diffuse plate in which diffuse particles are sealed in a transparent base material, by sealing the diffuse particles having anisotropic shapes in the diffuse plate while being oriented, anisotropy may be imparted to the diffuse angle of light emitted from the diffuse cells 210.

The diffuse cells 210 may be formed into elliptic arc shapes in either or both of the direction of the major axis 2L and the direction of the minor axis 2S in place of the convex regular circular arc shapes. The diffuse cells 210 may be formed into other arc shapes having other aspheric surfaces than the circular arc shapes.

Thus, as has been described in the embodiment, according to the light source unit 60 and the projector 10 in which the diffuse plate 200 in which the diffuse plate 200 has the plurality of arc-shaped diffuse cells 210 arranged along either of the first direction (the direction of the major axis 2L) and the second direction (the direction of the minor axis 2S) which is substantially at right angles to the one direction of the exit side surface thereof which lies opposite to the entrance side surface on which light source light is incident and the diffuse angle differs between the first direction and the second direction, the effect of distributing the luminance of the light source light uniformly can be enhanced. Owing to this, it is possible to provide the light source unit 60 and the projector 10 which can decrease the unevenness in luminance of the light source light.

According to the light source unit 60 in which the diffuse cells 210 have the non-polygonal shapes including at least the different shapes as seen from the front, the diffuse cells 210 having the circular arc-shaped lens surfaces 211 can be disposed on the diffuse plate 200 without any gaps.

According to the light source unit 60 in which the diffuse cells 210 have the lens surfaces which are formed into the regular circular arc shapes in the first direction and the second direction, light can be diffused in the first direction and the second direction.

According to the light source unit 60 having the diffuse cells 210 in which the radius of curvature is great in the first direction while the radius curvature in the second direction is small, the diffuse light emitted from the diffuse plate 200 is diffused at the small diffuse angle in the one direction while in the other direction, the diffuse light is diffused at the diffuse angle which is greater than the diffuse angle in the first direction.

According to the light source unit 60 having the diffuse cells 210 of the elliptic arc shapes which are formed along either or both of the first direction and the second direction, light emitted from near the center of the diffuse cells can be restricted from diffusion or can be diffused well compared with the diffuse cells 210 of the regular circular arc shapes.

According to the light source unit 60 in which the diffuse cells 210 are circular arc-shaped cylindrical lenses which are formed in the second direction, light that is transmitted through the diffuse cells 210 can be restricted from being diffused in the second direction.

According to the light source unit 60 which includes further the second diffuse plate which diffuses the light source light in an isotropic direction so as to be emitted towards the diffuse plate 200, the luminance of the light source light can be distributed uniformly.

According to the light source unit 60 in which the apexes of the diffuse cells 210 are positioned so as to deviate from one another, the diffuse angle of light emitted from the diffuse cells 210 can be varied.

According to the light source unit 60 which includes the diffuse cells 210 which differ at least in height, even light which is incident on the diffuse cells 210 of the same width is emitted at different diffuse angles. Owing to this, the diffuse angle can be varied.

According to the light source unit 60 which includes the lens array 400 which has the plurality of lens cells 410 and which distributes uniformly the luminance of the light source light that is transmitted through the diffuse plate 200, the light source light can be emitted in which the unevenness in luminance is reduced.

According to the light source unit 60 in which the lens cells 410 have the long sides and the short sides like a rectangle, the light source light can be collected to the predetermined rectangular areas by superposing pencils of light whose cross section is rectangular.

According to the light source unit 60 in which the diffuse plate 200 is disposed so that the direction of the short side of the lens cell 410 coincides with the first direction and the direction of the long side thereof coincides with the second direction, in the diffuse light which is incident on the lens cell 410, the entrance angle can be increased to a great entrance angle in the direction of the long side 4L of the lens cell 410 while the entrance angle can be decreased to a small entrance angle in the direction of the short side 4S. Thus, the luminance of light can be distributed uniformly with good efficiency according to the shapes of the lens cells 410, 420.

According to the projector 10 which includes the light source unit 60 described above and the display device 51 on to which light emitted from the light source unit 60 is shone to thereby generate projected light and in which the aspect ratio of the lens cells 410 is the same as the aspect ratio of the display device 51, the light source light which is shone on to areas of the display device 51 which are not involved in forming an image by the projector 10 can be decreased. Owing to this, the utilization efficiency of light source light required for image formation can be enhanced.

In the embodiment, the shapes of the diffuse cells 210 are described as being the non-regular hexagonal shapes. However, regular hexagonal shapes may be adopted as long as one direction represents a major axis 2L and the other direction represents a minor axis 2S which is at right angles to the major axis 2L. Alternatively, any polygonal shapes other than hexagonal shapes may be adopted.

The embodiment that has been described heretofore is presented as the example, and there is no intention at all to limit the scope of the invention by those embodiments. The novel embodiment can be carried out in other various forms, and hence, various omissions, replacements, alterations and modifications can be made thereto without departing from the spirit and scope of the invention. The resulting embodiments and their modifications are not only included in the spirit and scope of the invention but also included in the scope of inventions claimed under claims and their equivalents.

What is claimed is:

1. A light source unit comprising:
    a solid light emitting device configured to emit light source light;
    a first diffuse plate configured to diffuse the light source light; and
    a lens array comprising a plurality of rectangular lens cells, wherein the lens array is configured to uniformize the light source light transmitted through the first diffuse plate,
    wherein the first diffuse plate comprises a plurality of convex arc-shaped diffuse cells elongated in a long side direction, on an exit side surface of the first diffuse plate from which the light source light exits, wherein the long side direction of each of the plurality of convex arc-shaped diffuse cells intersects a short side direction of the each of the plurality of convex arc-shaped diffuse cells at substantially right angles,
    wherein the plurality of convex arc-shaped diffuse cells have a plurality of different polygonal shapes as seen from a plan view of the exit side surface and the plurality of different polygonal shapes have the same number of corners, and
    wherein the first diffuse plate is disposed such that:
        a short side direction of each of the plurality of rectangular lens cells coincides with the long side direction of the each of the plurality of convex arc-shaped diffuse cells and a long side direction of the each of the plurality of rectangular lens cells coincides with the short side direction of the each of the plurality of convex arc-shaped diffuse cells, and
    the diffuse angle of the each of the plurality of convex arc-shaped diffuse cells in the long side direction of the each of plurality of convex arc-shaped diffuse cells is smaller than the diffuse angle of the each of the plurality of convex arc-shaped diffuse cells in the short side direction of the each of the plurality of convex arc-shaped diffuse cells.

2. The light source unit according to claim 1,
    wherein the each of the plurality of convex arc-shaped diffuse cells has a lens surface which is formed into a convex regular circular arc shape in the long side direction and the short side direction of the each of the plurality of convex arc-shaped diffuse cells.

3. The light source unit according to claim 2,
    wherein the each of the plurality of convex arc-shaped diffuse cells has a greater radius of curvature in the long side direction of the each of the plurality of convex arc-shaped diffuse cells and a smaller radius of curvature in the short side direction of the each of the plurality of convex arc-shaped diffuse cells.

4. The light source unit according to claim 2,
    wherein the each of the plurality of convex arc-shaped diffuse cells are disposed in such a way that apexes thereof are positioned so as to deviate from one another.

5. The light source unit according to claim 2,
    wherein the each of the plurality of convex arc-shaped diffuse cells are different in at least height.

6. The light source unit according to claim 1,
    wherein the each of the convex plurality of arc-shaped diffuse cells has an elliptic arc shape which is formed in either or both of the long side direction of the each of the plurality of convex arc-shaped diffuse cells and the short side direction of the each of the plurality of convex arc-shaped diffuse cells.

7. The light source unit according to claim 1,
    wherein the each of the plurality of convex arc-shaped diffuse cells is a convex arc-shaped cylindrical lens which is formed in the short side direction of the each of the plurality of convex arc-shaped diffuse cells.

8. The light source unit according to claim 7, comprising further:
    a second diffuse plate configured to diffuse the light source light in an isotropic direction so as to emit the light source light towards the first diffuse plate.

9. The light source unit according to claim 1,
    wherein the each of the plurality of convex arc-shaped diffuse cells is disposed in such a way that apexes thereof are positioned so as to deviate from one another.

10. A projector comprising:
    the light source unit according to claim 1; and
    a display device on to which light emitted from the light source unit is shone to thereby generate projected light.

11. The projector according to claim 10, further comprising:
    a projection optical system configured to project the projection light generated by the display device; and
    a projector control unit configured to control the light source unit and the display device.

12. A projector comprising:
    the light source unit according to claim 1, and
    a display device on to which light emitted from the light source unit is shone to thereby generate projected light, wherein the aspect ratio of the plurality of rectangular lens cells is the same as the aspect ratio of the display device.

\* \* \* \* \*